(12) United States Patent
Bloch et al.

(10) Patent No.: US 7,752,256 B2
(45) Date of Patent: Jul. 6, 2010

(54) PRESENTATION SERVER

(75) Inventors: Eric D. Bloch, San Francisco, CA (US); Max D. Carlson, San Francisco, CA (US); Christopher Kimm, San Francisco, CA (US); James B. Simister, San Francisco, CA (US); Oliver W. Steele, Brookline, MA (US); David T. Temkin, San Francisco, CA (US); Adam G. Wolff, San Francisco, CA (US)

(73) Assignee: Laszlo Systems, Inc., San Mateo, CA (US)

( * ) Notice: Subject to any disclaimer, the term of this patent is extended or adjusted under 35 U.S.C. 154(b) by 866 days.

(21) Appl. No.: 10/092,010

(22) Filed: Mar. 5, 2002

(65) Prior Publication Data

US 2003/0195923 A1  Oct. 16, 2003

Related U.S. Application Data

(60) Provisional application No. 60/349,671, filed on Jan. 16, 2002.

(51) Int. Cl.
*G06F 15/16* (2006.01)
(52) U.S. Cl. ..................................... 709/203
(58) Field of Classification Search ................ 709/203, 709/217–219; 715/513–516, 530, 700, 760, 715/746; 717/140, 146–148, 114
See application file for complete search history.

(56) References Cited

U.S. PATENT DOCUMENTS

| | | | |
|---|---|---|---|
| 5,987,256 A * | 11/1999 | Wu et al. ..................... 717/146 |
| 6,085,224 A * | 7/2000 | Wagner ....................... 709/203 |
| 6,253,326 B1 | 6/2001 | Lincke et al. |
| 6,305,012 B1 | 10/2001 | Beadle et al. |
| 6,473,609 B1 | 10/2002 | Schwartz et al. |
| 6,643,696 B2 * | 11/2003 | Davis et al. .................. 709/224 |
| 6,701,522 B1 * | 3/2004 | Rubin et al. ................. 717/178 |
| 6,957,392 B2 * | 10/2005 | Simister et al. ............. 715/746 |
| 6,976,248 B2 * | 12/2005 | Balassanian ................ 717/148 |
| 7,062,530 B2 * | 6/2006 | Scheinkman ................ 709/203 |
| 7,068,381 B1 * | 6/2006 | Tuli ........................... 358/1.15 |
| 7,149,964 B1 * | 12/2006 | Cottrille et al. ............. 715/513 |
| 7,178,106 B2 * | 2/2007 | Lamkin et al. .............. 715/716 |

(Continued)

OTHER PUBLICATIONS

Microsoft Press Computer Dictionary, 1997, Microsoft Press, Third Edition, p. 238.*

(Continued)

*Primary Examiner*—Philip C Lee
*Assistant Examiner*—Benjamin Ailes
(74) *Attorney, Agent, or Firm*—Vierra Magen Marcus & DeNiro LLP

(57) ABSTRACT

A server is disclosed that presents content to a client. The server receives a request for particular content. In response to the request, the server accesses data and/or code that describes the particular content. The server compiles that code and/or data to create executable code, and transmits the executable code to the client for execution on the client. In one embodiment, the code describing the particular content is a mark-up language description. In various implementations, the executable code includes a user interface that provides access to the requested content.

37 Claims, 10 Drawing Sheets

U.S. PATENT DOCUMENTS

| | | | |
|---|---|---|---|
| 7,210,093 B1* | 4/2007 | Dutta .................... | 715/501.1 |
| 7,240,283 B1* | 7/2007 | Paila et al. ................ | 715/517 |
| 7,249,196 B1* | 7/2007 | Peiffer et al. ............. | 709/246 |
| 7,277,912 B2* | 10/2007 | Corboy et al. ............ | 709/203 |
| 2002/0069420 A1* | 6/2002 | Russell et al. ............. | 725/92 |
| 2002/0156909 A1* | 10/2002 | Harrington ............... | 709/231 |
| 2003/0013483 A1* | 1/2003 | Ausems et al. ............ | 455/556 |
| 2006/0041639 A1* | 2/2006 | Lamkin et al. ............ | 709/219 |
| 2007/0208805 A1* | 9/2007 | Rhoads et al. ............ | 709/203 |
| 2008/0034121 A1* | 2/2008 | Dove et al. ............... | 709/249 |

OTHER PUBLICATIONS

Lemay, Laura and Rogers Cadenhead, Java 2 Platform in 21 Days, 1999, Sams Publishing, pp. 184-190.*

* cited by examiner

PRESENTATION SERVER

CROSS-REFERENCE TO RELATED APPLICATIONS

This application claims the benefit of U.S. Provisional Application No. 60/349,671, entitled, "Interactive System," filed on Jan. 16, 2002, incorporated herein by reference.

This Application is related to the following Application: "Interface Engine Providing A Continuous User Interface," by J. Bret Simister, Adam G. Wolff, Max D. Carlson, Christopher Kimm, and David T. Temkin, U.S. patent application Ser. No. 10/092,360, filed Mar. 5, 2002, Publication No. 2003/0132959, incorporated herein by reference.

BACKGROUND OF THE INVENTION

1. Field of the Invention

The present invention is directed to technology for providing content.

2. Description of the Related Art

The Internet has become very popular. Many people and businesses use the Internet to access data, applications, entertainment, productivity tools, and so on. However, web pages and web applications are built around the page metaphor, which constrains application interaction. That is, typical web pages are displayed a page at a time and lack the fluid feel and features of other user interfaces. Many feel that this limitation is due to the shortcomings of HTML, while others lay blame on the limitations of browsers.

Some previous attempts to provide dynamic user interactions include downloading source code directly to the client. For example, Javascript code is often downloaded directly to the browser. The browser then interprets the code directly. This approach is limited because Javascript is typically not portable (different browsers offer differing support for the language) and Javascript severely limits the interactions that can be specified by the programmer.

Another attempted solution involves the downloading of statically pre-compiled bytecode. For example, Java applets can be downloaded to a browser when a user accesses a web page. The Java source code for the applet is fixed, written in advance, and pre-compiled into an applet. When the user accesses the page, the applet is downloaded into the browser and the bytecode is interpreted (or compiled into machine code by a JIT compiler). One of several shortcomings of this approach is that Java is not sufficiently prevalent on all types of clients. That is, not all clients have the ability to interpret (or JIT compile) Java bytecode. Another shortcoming is that applets can be quite large to download and slow to run. Furthermore, creating Java applets is a complicated processes. Many web designers are not able or do not have the resources to take advantage of Java applets. Finally, because the code is written and compiled in advance, it is not dynamic.

Another attempt to provide more complex user interactions includes developing a complete standalone (non-browser based) application. The source code for this application is compiled statically. The end-user must specifically request that the binary object code for the program be downloaded over the network or he/she must install it from some other external source. This approach is typically even more expensive then Java applets and suffers even worse deployment issues.

Another solution includes dynamically generated HTML, which involves dynamically creating HTML source code in response to a request for content. The dynamically created source code is then transmitted from the server to the client browser, where it is used to provide content to the user. Although the code is generated dynamically, the code is still HTML which limits, as described above, the features of the user interface.

Thus, there are no complete solutions today that provide complex, feature rich dynamic interactions without the shortcomings of the prior art.

SUMMARY OF THE INVENTION

The present invention, roughly described, includes a system that presents content (e.g. including, but not limited to, interactive content, applications, video, audio, etc.) to a client without the shortcomings of the prior art. One embodiment of the present invention includes a server that receives a request for particular content. The server accesses a mark-up language description of the particular content and compiles that mark-up language description to create executable code (e.g. object code, byte code, etc.). The compilation of the mark-up description by the server is performed in response to the received request. The executable code is then transmitted from the server to the client. In one embodiment, the server can be contained within an application server or web server, and the client includes a browser that communicates with the server via the Internet, or other network.

Another embodiment of the present invention also includes a server receiving a request for particular content. In response to the request, the server accesses first code associated with the particular content and compiles the first code to create executable code which implements a user interface that provides access to the particular content. The server then transmits the executable code to the client. The user interface provides windows, dialogs, buttons, images, sounds, text fields, banners, animation, etc.

In some embodiments, the requested content includes data. The requested data is accessed at the server and compiled to create executable code. The executable code includes a representation of the data. The server transmits the executable code to the client.

By compiling the code at the server, the downloads to the client are smaller and the client does not need to take the time to compile the downloaded code. Therefore, the user experiences less time waiting for the interaction with the desired content.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM or other suitable storage devices. In one embodiment, the software can be performed by one or more processors. In alternative embodiments, some or all of the software can be replaced by dedicated hardware including custom integrated circuits, gate arrays, FPGAs, PLDs, and special purpose processors. One example of hardware that can implement all or portions of the present invention includes a processor, storage elements, peripheral devices, input/output devices, displays, and communication interfaces, in communication with each other as appropriate for the particular implementation.

The advantages of the present invention will appear more clearly from the following description in which the preferred embodiment of the invention has been set forth in conjunction with the drawings.

DETAILED DESCRIPTION

The presentation server includes server-deployed software that enables developers to easily and economically create network-aware applications with rich, interactive user-interfaces. The presentation server is designed to receive a mark-up language description of a user-interface and dynamically compile that mark-up language description to executable code. In one environment, the mark-up language description is an XML-based language that is designed specifically for describing an application's user interface, along with the connection of that user-interface to various data sources and/or web services. It contains standard user interface primitives like "window," "button," "text," "scroll bar," and so on, as well as syntax for automatically connecting user-interface items with back-end data sources and services. The mark-up language can also include a scripting language for procedural specification of application behavior that is similar to Javascript.

Figure 1:
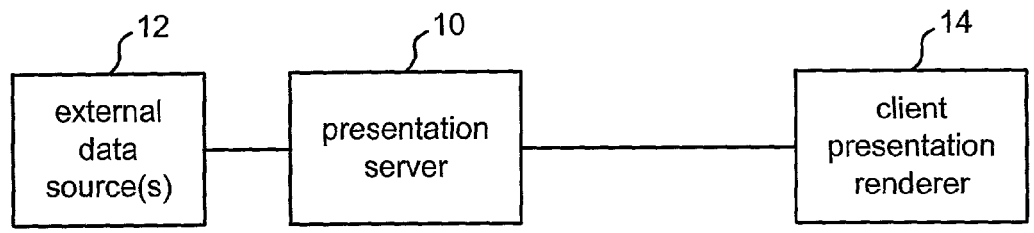
FIG. 1 is a block diagram of one embodiment of the present invention.

In one embodiment, the presentation server generates highly optimized/compressed object code for a given Presentation Renderer. A Presentation Renderer is a software environment, hardware, set of one or more software programs, etc. that can display graphics and play sound. FIG. 1 is a block diagram providing a high-level description of one exemplar implementation of the present invention. FIG. 1 shows Presentation Server 10 in communication with external data source(s) 12 and client Presentation Renderer 14. Communication between the various elements can be via network, dedicated connection, wireless connection, or any other connection that is suitable for appropriate communication. The external data sources can include databases, directories, web services, or any other storage device or structure that can hold data. Client Presentation Renderer 14 can be generic software for providing a user-interface or can be specific software for the purpose of communicating with Presentation Server 10.

In one embodiment, client Presentation Renderer 14 is a Macromedia Flash Player embedded in a web client as a plug-in. While the Flash Player is an appropriate vehicle for Presentation Server 10, there is nothing inherent in the design of Presentation Server 10 that requires the Flash Player. Many other presentation renderers can also be utilized.

Figure 2:
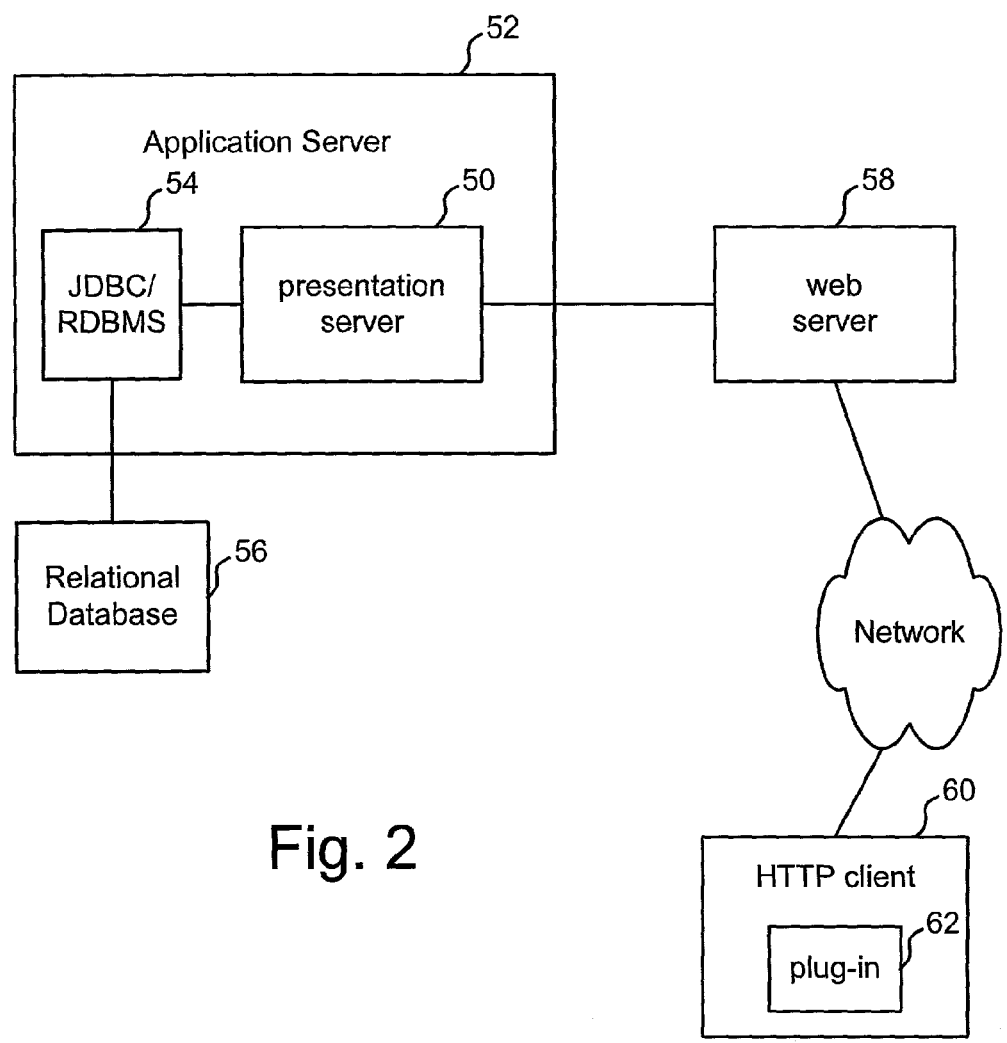
FIG. 2 is a block diagram of a second embodiment of the present invention.

FIG. 2 is a block diagram of another embodiment of the present invention. FIG. 2 shows Presentation Server 50 implemented as a Java Servlet that compiles server located mark-up language description files and data into object code. In one embodiment, Presentation Server 50 generates object code for the Macromedia Flash Player. Presentation Server 50 can be hosted by any standard Java Servlet implementation, including Jakarta Tomcat and J2EE servers like BEA Weblogic and IBM Websphere. When hosted in a J2EE server, the presentation server takes advantage of services that are available including JDBC and JCA. FIG. 2 shows Presentation Server 50 hosted in Application Server 52. Application server 52 also includes JDBC to RDBMS services 54, which is in communication with relational database 56. As stated above, other types of data sources, other than a relational database can also be used. Presentation Server 50 receives requests and sends responses via Web Server 58, which is in communication with clients via a network. That network can be any standard network known in the art, including the Internet, a LAN, a WAN, etc. For example, FIG. 2 shows an HTTP client 60 (e.g. browser) with plug-in 62 (e.g. Flash Player) in communication with Presentation Server 50 via Web Server 58.

Figure 3:
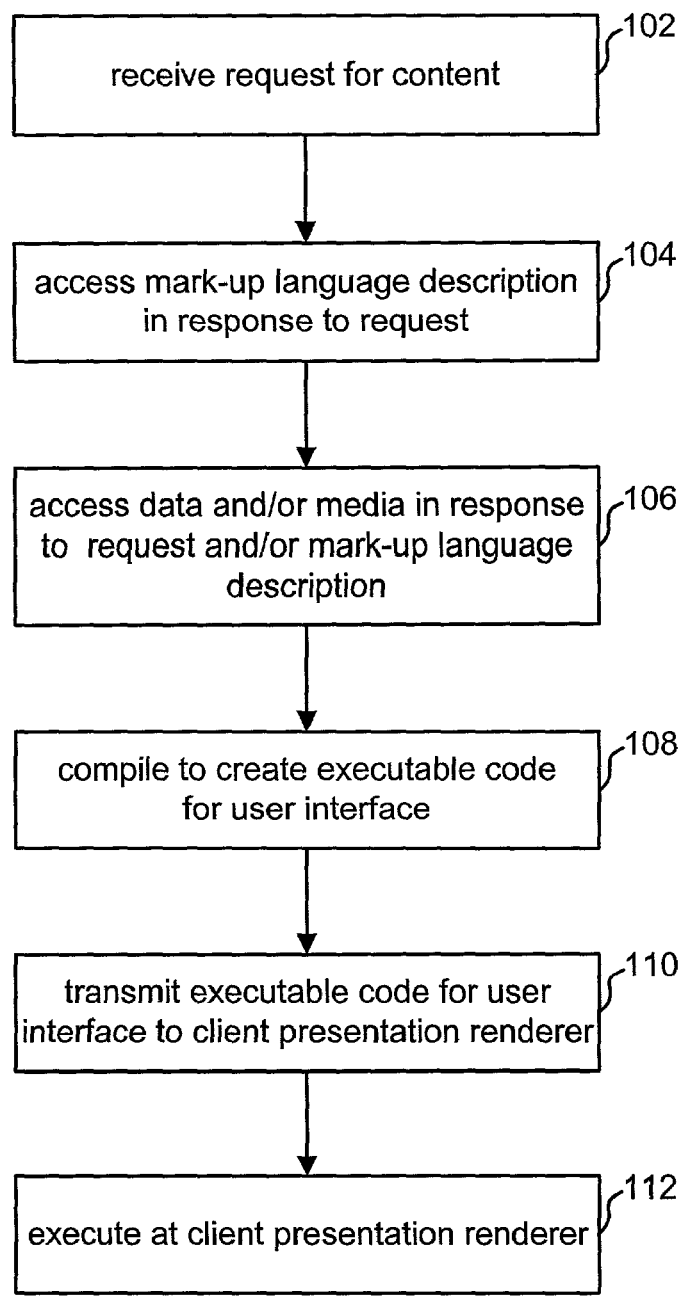
FIG. 3 is a flow chart describing one embodiment of a process for implementing the present invention.

FIG. 3 is a flow chart describing one exemplar embodiment of the operation of the present invention. In step 102, the Presentation Server receives a request for content. The content can be a Web page, media, data, an application, or anything else accessible via a network. In step 104, the Presentation Server accesses a mark-up language description of the content in response to the received request. In some embodiments, a mark-up language description is not used and, thus, step 104 is not performed. In step 106, Presentation Server accesses any data and/or media in response to the request or in response to the mark-up language description. In some instances, the request will not require any data or media and, therefore, step 106 can be skipped. In step 108, the mark-up language description, data and/or media are compiled to create executable code for a user interface. In step 110, the executable code is transmitted to the client Presentation Renderer. In step 112, the executable code is executed at the client Presentation Renderer.

As stated above, some embodiments include the Presentation Server accessing a mark-up language description of the content requested. There are many different variations of mark-up languages that are suitable for the present invention. XML provides one example of a suitable framework for a mark-up language. One embodiment of the present invention uses an application of XML, referred to as the Laszlo application language. The Laszlo application language is described below.

Content available to the Presentation Server is described by one or more Laszlo application language source files. This can be a single file which defines all aspects of an application, or a source file can reference other files through the use of include statements. The Laszlo application language is an application of XML, with ECMAScript used to specify user interface behaviors and application logic. ECMAScript code is contained within script tags, or as the value of certain attributes. This is similar to the use of JavaScript to enhance HTML pages, except that the document specifies the view structure of an application, rather than the text structure of a page. Features of the Laszlo application language include: the ability to define user-interface elements via XML, or ECMAScript; the ability to define custom user-interface classes, incorporating custom art assets and behaviors, via XML, or ECMAScript; the ability to attach custom properties and behaviors to user-interface elements and classes; XML access to all classes in the runtime support library; the ability to include external media assets such as JPEG and PNG images, SWF animations, and MP3 audio; inline definition of formatted text (via HTML), and vector graphics (via SVG); data source connections to define a connection to an external data source; and support for multiple skins.

Below is an example of Laszlo application language:

```
<lz>
    <window title="Hello World">
        <text><i>Hello</i>, World!</text>
        <button onclick="beep( ) ">Press Me!</button>
    </window>
    <script>
        function beep( ) {sys.beep( ) }
    </script>
</lz>
```

When the above code is executed, a single window titled "Hello World" is displayed. The window includes the text "Hello, World!" (with "Hello" in italics) and a button which plays a beep sound when pressed.

A Laszlo application language source file is an XML file, with a root element of lz. The lz element contains elements that define various aspects of the application: its visual appearance, its behavior, and its connection to an external data source. Examples of the different elements include:

View templates;
View class definitions;
Scripts, for program logic; and
Database connection definitions.

Below is an example of code that uses these elements. The code will become clearer to the reader as the discussion continues.

```
<lz>
    <window title="Simple Window" x="5" y="10">
        <image src="logo.jpeg"/>
        <text>Hello, World!</text>
        <button onclick="otherWindow.show( ) ;">
            Click Me!</button>
    </window>
    <class name="MyWindow" extends="LzWindow">
        ...
    </class>
    <window id="otherWindow" class="MyWindow"
    visible="false">
        <svg>
            <rect x="100" y="50" fill-color="red"/>
            <circle x="100" y="50" fill-color="green"/>
        </svg>
        <button onclick="userfn( ) "/ >
    </window>
    <script>
        def userfn( ) {otherWindow.hide( ) }
    </script>
</lz >
```

A view template is an XML description of a view (a window, a button, a dialog, or other user interface element), which is instantiated when the application is run. A view template may occur immediately within the document root element, or nested within another view template (or a class definition). A view template that occurs directly within the document root element is a root view template. An application source file may contain any number of root view templates, and they may be interleaved with other elements, such as script, data source elements and class definitions. If an application doesn't contain any view templates, it will have no visible behavior, unless its script code uses the view system API to create a view programmatically.

An application source file may contain at most one canvas element. If a canvas element is present, it must precede (or contain) any other view elements. The canvas element defines properties of the global canvas, which is the root of the runtime view hierarchy; all other views are directly or indirectly contained within the canvas element. If the canvas element is not present, an implicit canvas is created. All root view templates create views that are children of the canvas, whether it is explicit or not.

A view template may contain other view templates. The XML element hierarchy is mapped to a runtime view hierarchy: view templates that are children of a parent view template instantiate views that are children of the parent view. Below is an example of application source file that defines a single view:

```
<lz>
    <window title="Title" x="5" y="10"/>
</lz>
```

Below is an example of pseudocode that defines nested views

```
<lz>
    <window title="Title" x="5" y="10">
        <view .../>
        <view .../>
    </window>
</lz>
```

Each view is an instantiation of a view class. A view class supplies default properties, behavior, and child views, which specific view templates instantiate. The system includes pre-defined view classes and user defined view classes (view class definitions).

The following is an exemplar list of pre-defined view classes: canvas, dialog, window, view, listView (a vertical list of items), tableView (a horizontal list of listViews), gridView, menubar, menu, menu item, button, and text.

The table below lists XML elements and their ECMAScript equivalents:

| XML element name | ECMAScript class name |
| --- | --- |
| canvas | LzCanvas |
| dialog | LzDialog |
| window | LzWindow |
| text | LzText |
| button | LzButton |
| menubar | LzMenubar |
| menu | LzMenu |
| menuitem | LzMenuItem |
| instance | user-defined view class |

Each view template includes a set of attributes. The table below lists exemplar attributes.

| Attribute name | Type | Default value | Description |
| --- | --- | --- | --- |
| title | string | "" | Title (for windows and dialogs) |
| visible | boolean | true | If true, the view is visible when initially instantiated. |
| x | float | 0.0 | Horizontal displacement from the containing view, or from the canvas. |
| y | float | 0.0 | Vertical displacement from the containing view, or from the canvas. |

A view instance may also contain one or more references to media. One example of a reference to media is an image reference. An image reference is a reference to an external image, or an embedded svg element. SVG is an XML application for describing vector graphics. SVG is known in the art and more information about SVG can be found at www.w3.org. The image is usually used as a background image, but the interpretation of an image reference contained within a view depends on the view that contains it. In one embodiment, an image reference is created in one of at least three ways:

(1) The svg element contains inline svg.

```
<window>
    <svg>
        <rect width="100" height="50" fill-color="red" frame-color="blue"/>
        <circle width="100" height="50" fill-color="green"/>
    </svg>
</window>
```

(2) The image element references an external media file that contains a static image.

```
<window>
    <image src="image.jpeg"/>
    <button>Okay</button>
</window>
```

(3) The element references a swf file, that contains a Flash movie.

```
<window>
    <swf src="image.swf"/>
    <button>Okay</button>
</window>
```

Within the Laszlo application language, it is possible to associate an action with events that occur when a user interacts with an application. The attributes in the list below are associated with scripts that are executed when the corresponding event occurs. The scripts are created by the developer who creates the mark-up language description. The names of the attributes, and the associated events, are defined in HTML 4.01 Specification.

| name | description |
| --- | --- |
| onclick | The onclick script is executed when the pointing device button is clicked over an element. |
| ondblclick | The ondblclick script is executed when the pointing device button is double clicked over an element. |
| onmousedown | The onmousedown script is executed when the pointing device button is pressed over an element. |
| onmouseup | The onmouseup script is executed when the pointing device button is released over an element. |
| onmouseover | The onmouseover script is executed when the pointing device button is moved onto an element. |
| onmousemove | The onmousemove script is executed when the pointing device is moved while it is over an element. |
| onfocus | The onfocus script is executed when an element receives focus either by the pointing device or by tabbing navigation. |
| onblur | The onblur script is executed when an element loses focus either by the pointing device or by tabbing navigation. |
| onkeypress | The onkeypress script is executed when a key is pressed and released over an element. |
| onkeydown | The onkeydown script is executed when a key is pressed down over an element. |
| onkeyup | The onkeyup script is executed when a key is released over an element. This attribute may be used with most elements. |
| onselect | The onselect script is executed when a portion of text is selected. |
| onchange | The onchange script is executed when text is changed. |

The application file may contain view class definitions, which use XML to define view classes. A view class definition is created using the following exemplar syntax:

```
<class name="MyWindow" extends="LzWindow">
    <property name="p1" value="1"/>
    <property name="p2" value="'2'"/>
    <view ...>
    <view ...>
</class>
```

This code declares a class named MyWindow that subclasses LzWindow, has two additional properties p1 and p2 with default values 1 and 2, and has two default child views, in addition to whatever default child views LzWindow has. A view class definition can also override methods of a super class. This example could also have been written as:

```
<script>
    class MyWindow extends LzWindow {
        val p1=1;
        val p2='2';
        constructor MyWindow( ) {
            this.attach(...);
            this.attach(...);
        }
    }
</script>
```

Script code can instantiate the class as follows:

w=new MyWindow( . . . ).

A view template can define an instance of the new class thus:

```
<window class="MyWindow" x=...>
    <property name= ... value= .../>
    <property name= ... value= .../>
    <view ...>
</window>
```

The above described mark-up language can be used to describe many different user interfaces. The exact type of user interface is not important to the present invention. One example of a user interface system can be found in the Application: "Interface Engine Providing A Continuous User Interface," by J. Bret Simister, Adam G. Wolff, Max D. Carlson, Christopher Kimm, and David T. Temkin, U.S. patent application Ser. No. 10/092,360, filed Mar. 5, 2002, Publication No. 2003/0132959, incorporated herein by reference The above discussion describes an exemplar mark-up language. This mark-up language can make use of a scripting language. For example, the Laszlo application language uses a scripting language called LaszloScript, which is based on ECMAScript-262 Edition 3, with two extensions from ECMAScript-262 Edition 4: classes definitions and the "super" expressions. Classes are defined using the ECMAScript Edition 4 class keyword. The syntax is:

```
ClassDefinition: "class" Identifier [Inheritance] Block
    | "class" Identifier
Inheritance: empty
    | "extends" ClassName
```

In one embodiment, a LaszloScript class definition is equivalent to an XML class definition of the same symbol. In particular, the "inherits" attribute of an XML class element may refer to a class defined using the LaszloScript class definition; an XML instance element may instantiate a class defined in LaszloScript; and a LaszloScript class definition may extend a class defined in XML. A class must be defined before it is referenced. Super expressions may only be used inside a class method. Super expressions change the behavior of the operator in which it is embedded by limiting its property search to definitions inherited from the superclass.

Below is a table, which describes differences between Laszlo Script and ECMA Script3.0:

| | |
|---|---|
| String-to-Boolean conversion | In ECMA-262, any nonempty string converts to true. LaszloScript converts strings to true only if they evaluate to a nonzero number. |
| Case sensitivity | In LaszloScript, keywords are case-sensitive but identifiers are not. This does not comply with ECMA-262, which demands complete case sensitivity. |
| Undefined datatype conversion | LaszloScript converts undefined to the empty string ("") in a string context or to 0 (zero) in a numeric context. ECMA-262 converts undefined to the string "undefined" in a string context or to NaN in a numeric context. |
| Unicode support | LaszloScript supports the multi-byte character sets, but does not offer full Unicode support. |
| eval support | The argument to eval must be a string that names a singleidentifier. |

There are at least four mechanisms for including scripts in a Laszlo application language description of content:

As the content of a method element. A script in this position must have the syntactic type SourceElements (defined in ECMAScript-262 Edition 3); that is, it must be a sequence of variable definitions and statements.

As the content of script element. A script in this position must have the syntactic type Program; that is, it must be a sequence of variable definitions, function definitions, and statements.

As the value of an event attribute. A script in this position must have the syntactic type SourceElements.

As the content of a file referenced by a script tag's href attribute. A script in this position must have the syntactic type Program.

The first two mechanisms put the script source within an XML element. The XML markup characters < and & must be quoted to prevent them from being parsed as XML markup. An example of a badly quoted script is "<script>function lt(a,b) {return a<b;}</script>." This won't work because the < in a<b will be interpreted as the beginning of an XML element. Examples of acceptable scripts include "<script>function lt(a,b) {return a < b;}</script>"

and "<script><![CDATA[function lt(a,b) {return a<b;}]]></script>"

The Laszlo application language also allows for the use of data connection descriptions, which describe a connection to a data source (e.g. relational database, directory, other type of data structure, etc.). Datasources are specified via the datasource element. A datasource can include several queries, which are referenced for elements within a view template. Below is an example of datasource connection that creates an odbc datasource named 'mydb' and queries named 'mydb.contacts' and 'mydb.contacts_desc'.

```
<datasource id="mydb" type="odbc"
DSN="DSN=oracle;UID=dbuser;PWD=dbpass" public="false"/>
    <query id="contacts" query="SELECT * FROM contacts
WHERE name LIKE '%a' AND city <> '' ORDER BY name" />
    <query id="contacts_desc" query="SELECT * FROM
contacts WHERE name LIKE '%a' AND city <> '' ORDER BY
name DESC" />
</datasource>
```

Below is an example of a data source connection for a second embodiment:

```
<datasource id="contacts" type="jdbc">
    <param id="username">max</param>
    <param id="password">myPass</param>
    <param id="hostname">10.10.20.4</param>
    <param id="port">3306</param>
    <param id="driver">org.gjt.mm.mysql.Driver</param>
    <dataview id="addresses">SELECT * FROM
        addresses</request>
    <dataview id="all">SELECT * FROM contacts WHERE
        ("userid" ==
    <expr>userid</expr>)</request>
</datasource>
```

This latter example includes dataview definitions instead of queries. A dataview retrieves all records an application will work with. Also note that the second dataview definition has <expr></expr> tags. These tags allow applications to dynamically define portions of dataview definitions—in this example the specific instance's user ID.

Below is an example of a datasource connection that creates an XML datasource named 'myxml' and a query named 'myxml.serverinf'.

```
<datasource id="myxml" type="xml" file="serverinfo.xml">
    <query id="serverinf" type="xslt">
    <xsl:stylesheet version="1.0"xmlns:xsl=
         "http://www.w3.org/1999/XSL/Transform">
    <xsl:output method = "text" />
    <xsl:template match="/"><xsl:apply-
         templates/></xsl:template>
    <xsl:template match="context">
    <record id="<xsl:value-of select="@recordid"/>"
         username="<xsl:value-of select="@username"/>"/>
         <xsl:apply-templates/>
    </xsl:template>
    </xsl:stylesheet>
    </query>
</datasource>
```

Below is an example of code for dynamically generating table rows:

```
<datasource id="contacts" type="jdbc">
    <param id="username">max</param>
    <param id="password">mypass</param>
    <param id="hostname">10.10.20.4</param>
    <param id="port">3306</param>
    <param id="driver">org.gjt.mm.mysql.Driver</param>
    <dataview id="addresses">SELECT * FROM
         addresses</request>
    <dataview id="all">SELECT * FROM contacts WHERE
         ("userid" ==
    <expr>userid</expr>)</request>
    <query id="allcontacts">
         <fields>
             <field name="displayname">
             <field name="email">
             <field name="phone">
         </fields>
    </query>
</datasource>
<window id="w1" title="Address Book" x="10" y="50"
    width="450" height="300">
    <scrolledview>
         <view datasource="contacts" dataview="all"
             query="allcontacts">
             <layout type="simple" axis="x"
                 spacing="0"/>
             <column label="Name" copies="20"
                 subviewrecords="next">
                 <datatext field="displayname" />
             </column>
             <column label="Name" copies="20"
                 subviewrecords="next">
                 <datatext field="displayname" />
             </column>
             <column label="Email" copies="20"
                 subviewrecords="next">
                 <datatext field="email" />
             </column>
             <column label="Phone" copies="20"
                 subviewrecords="next">
                 < datatext field="phone" />
             </column>
         </view>
    </scrolledview>
</window>
```

Below is an example for creating dynamic SVG:

```
<view>
    <for-each name="contact" source="mydb.contacts"
         position="below" spacing="2">
         <svg>
             <text value="contact.fname"/>
         </svg>
    </for-each>
</view>
```

The above description of the Laszlo application language provides one example of a suitable mark-up language that can be used with the present invention. Other mark-up languages/formats can also be used.

In one embodiment, a set of one or more files using the above-described (or another) mark-up language are compiled to create executable code for a presentation renderer. One example of a presentation renderer is the Macromedia Flash Player, which uses the SWF file format for its executable code. SWF files are binary files stored as 8-bit bytes. The container format consists of a header block with the structure shown below.

| CONTAINER FORMAT | | |
|---|---|---|
| FIELD | TYPE | COMMENT |
| Signature | UI8 | Signature byte 1 - always 'F' |
| Signature | UI8 | Signature byte 2 - always 'W' |
| Signature | UI8 | Signature byte 3 - always 'S' |
| Version | UI8 | Single byte file version |
| File Length | UI32 | Length of entire file in bytes |
| Frame Size | RECT | Frame size in TWIPS |
| Frame Rate | UI16 | Frame delay in 8.8 fixed number of frames per second |
| Frame Count | UI16 | Total number of frames in movie |

Following the header are a series of tagged data blocks. Each tag has a tag type and a length. There is both a short and long tag header format. Short tag headers are used for blocks with 62 bytes of data or less and large tag headers can be used for any size block. A short tag header has 9 bits used for the block type and 6 bits used for a block length in number of bytes. If a block is 63 bytes or longer, it should be stored in a long tag, which consists of a short tag whose length is 0x3 f and is followed by a 32-bit length. The following tables show the structure of both short and long tag record headers. A header is followed by its associated data.

| SHORT HEADER - for records less than 63 bytes in length | | |
|---|---|---|
| FIELD | TYPE | COMMENT |
| Tag | UB[10] | Tag id |
| Length | UB[6] | Length of tag |

Note that the short header is not a 10 bit field with the tag followed by a 6 bit length. It is actually a 16 bit word with the high order 10 bits having the tag and the low order 6 bits having the length.

| LONG HEADER - for records 63 bytes in length or greater | | |
|---|---|---|
| FIELD | TYPE | COMMENT |
| Tag | UB[10] | Tag id |
| Long Header Flag | UB[6] | Always 0x3F |
| Length | UI32 | Length of tag |

Definition tags are used to add character information to the dictionary. Definition tags define data that can be reused in a file like shapes, bitmaps, buttons, text, fonts and sounds. Control tags manipulate characters and provide administrative functions. For example, control tags are used to move objects on the screen, show frames, and start sounds.

Tags can occur in the file in any order. Definition tags must occur in the file before any control tags that refer to the character that is defined. The order of control tags defines the order of the animation. This ordering of tags is how the SWF file format supports streaming. The rule is that a given tag should only depend on tags that come before it. A tag should never depend on a tag that comes later in the file. The End tag should be used at the end of the file to indicate the file's end.

In order to support streaming and references between tags, SWF uses the concept of characters and a dictionary of characters that have been encountered so far in a file. A character has a 16-bit numeric name. Every character in a file must have a unique name. Typically, the first character is #1, the second character is #2 and so on. Character #0 is special and considered a null character. Characters are entered into the dictionary when a define tag is encountered in the .swf file. Characters are looked up in the dictionary based on the character identification number.

SWF uses integers and fixed point numbers for all of its coordinates and transformation matrices. The coordinate space is defined by integer coordinates. This coordinate space can be mapped to the display in any way that a player might want. By convention, coordinates are specified where one unit equals 1/1440 inches. On a typical 72 dpi display, this is equivalent to saying that a single pixel is divided into 20 units. This choice of units provides a good compromise between giving a high resolution for zooming in and precise placement of objects. A higher resolution would increased the file size because of the extra bits needed for precision.

The model for processing a stream is that all tags are processed in a stream until a ShowFrame tag is encountered. At that point, the display list is copied to the screen and the player is idle until it is time to process the next frame. A SWF file is divided into numbered frames by ShowFrame tags. Frame 1 is defined by performing all the control operations before the first ShowFrame tag. Frame 2 is defined by performing all the control operations before the second ShowFrame tag and so on.

The discussion above describes the input to the Presentation Server and the output from the Presentation Server. More details of the operation of the Presentation Server are now provided below.

Figure 4:
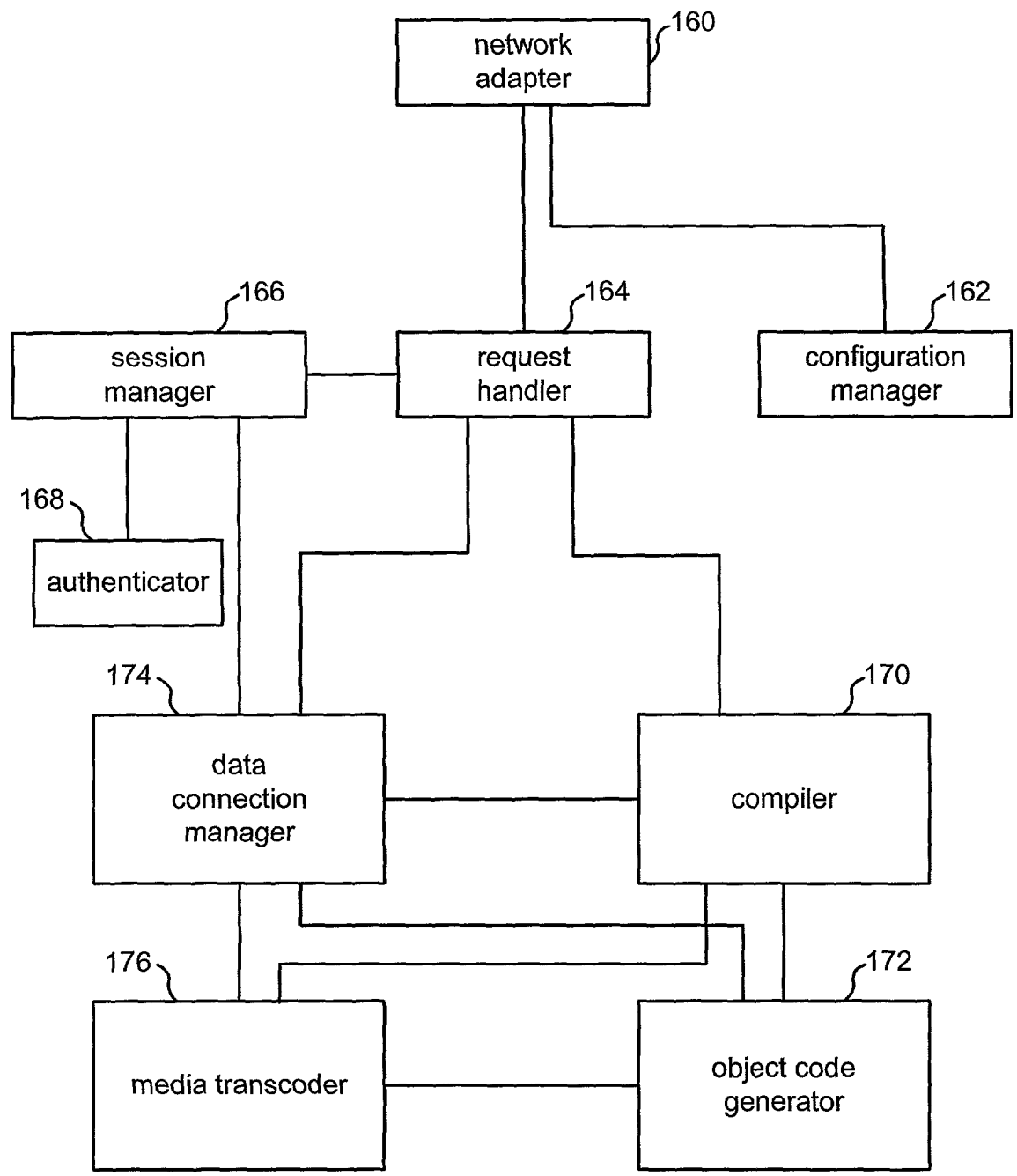
FIG. 4 is a block diagram of a presentation server according to one embodiment of the present invention.

FIG. 4 is a block diagram of one exemplar architecture for the Presentation Server. The main entry point to the Presentation Server is Network Adaptor 160, which is used to connect to the host. In one implementation, Network Adaptor 160 can include an implementation of the standard JAVA HttpServlet interface. At initialization time, this servlet receives configuration parameters from Configuration Manager 162. Configuration Manager 162 reads the configuration information from a local disk or other storage device. This information can include the desired logging (file names and level of status/error/debug logging), URL matching rules (patterns that describe how URLs map to local file system names), and authentication rules (patterns that describe which request require authentication). Configuration Manager 162 also keeps track of the plug-ins that are available for each of the plug interfaces in the presentation server. For example, Authenticator 168, discussed below, can include plug-ins for JDBC, LDAP, or other. Data Connection Manager 174 can include plug-ins for JDBC, SOAP, XML RPC, or other. Media Transcoder 176 can include interfaces for images (JPEG, GIF, BMP, PNG, other), audio (MP3, WAV, other), graphics (SVG, HTML, PDF, SWF, other), and video (MPEG, MPEG2, SORENSON, REAL, Animated GIF, other).

The Presentation Server listens for requests coming into the application server and/or web server via HTTP. As discussed, the Presentation Server can be within a web server, application server, or other system. The URLs for these requests are partially configurable at deployment time (some configuration via the HTTP Daemon and Servlet container, with additional configuration via Configuration Manager 162). Requests are handled by Request Handler 164. In one embodiment, a request can be for an application, data, service or other type of content. Each of these types of requests will be handled by Request Handler 164. Each request is associated with a session object, which is managed by Session Manager 166. Session Manager 166 can also access any one of a set of one or more Authenticators 168. In one embodiment, there can be one authenticator for each different type of authentication, for each type of content, or for each item of content. Each authenticator can be a plug-in, as described above. Request Handler 164 then communicates with Compiler 170 in order to compile the mark-up language descriptions of the requested content to object code. Compiler 170 communicates with Object Code Generator 172 to generate the object code. Request Handler 164 also communicates with Data Connection Manager 174 in order to receive data from or write data to external data sources. Data Connection Manager communicates with Object Code Generator 172 to generate object, which includes data received from these external sources.

FIG. 4 also shows Media Transcoder 176 in communication with Compiler 170, Object Code Generator 172, and Data Connection Manager 174. Media Transcoder 176 is used to transform media from unsupported formats to supported formats. For example, the Presentation Renderer may only be able to utilize media in certain preset formats, for example, perhaps the Presentation Render only accepts images that are JPEG. Thus Media Transcoder 176 will transform all images from whatever format they are in to JPEG. The system will know the accepted formats for any particular renderer and will use Media Transcoder 176 to transform media to those accepted formats.

It is contemplated that the presentation server can be used with various presentation renderers, separately or concurrently. The example of the Flash players is just one renderer that can be used with the present invention. In one embodiment, there can be separate object code generators and compilers for each Presentation Renderer. In other embodiments, Compiler 170 and Object Code Generator 172 can provide object coding in various different formats. It is contemplated that when there are multiple Presentation Renderers, the requests received by the presentation server will include an indication of the Presentation Renderer so that the system will generate object code specific to that Presentation Renderer. In other embodiments, there will be a separate presentation server for each type of presentation renderer. Other configurations can also be used. In another embodiment, the compiler can be set up as two sets of components: a front end component and one or more back end components. The front end component is shared across all presentation renderers and wil communicate to each back end component. There will be one back end component for each presentation renderer.

Figure 5:
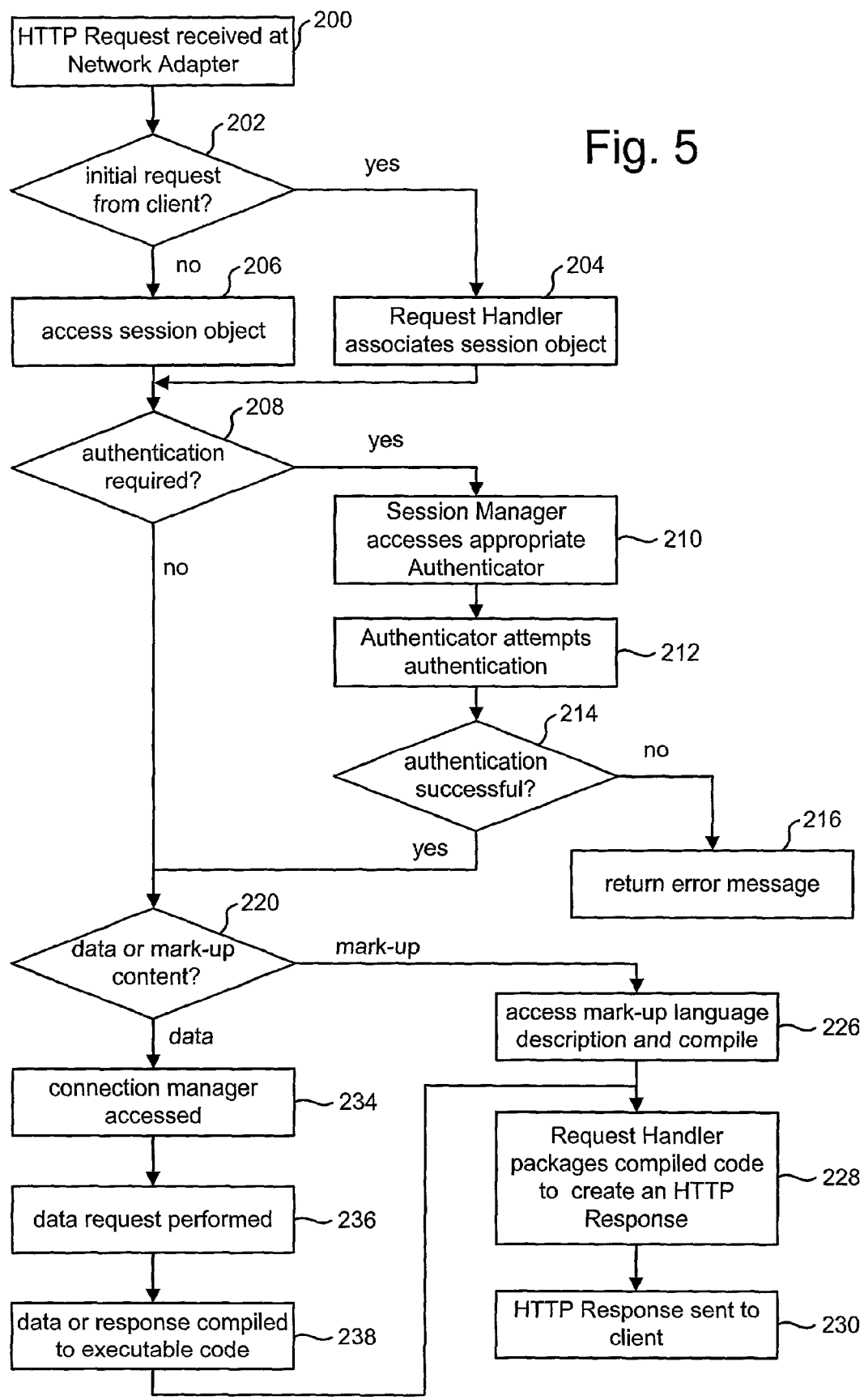
FIG. 5 is a flow chart describing one embodiment of the operation of the presentation server.

FIG. 5 is a flow chart describing one embodiment of the operation of the presentation server of FIG. 4. In step 200, an HTTP request is received at Network Adaptor 160. Protocols other than HTTP can also be used. In step 202, it is determined whether this is an initial request from the particular client. If it is an initial request, then Request Handler 164 associates a session object with the client (step 204). If this is not an initial request, then the already existing session object for that client is accessed and associated with the request in step 206. The session object stores session specific state information, for example, the state of authentication. In step 208, it is determined whether authentication is required. If this request must be authenticated, then Session Manager 166 calls the Authenticator 168 that is currently registered with the session in step 210. Authenticator 168 attempts to authenticate in step 212. Authenticator 168 marks the status of the request as authenticated or not. In step 214, it is determined whether authentication is successful. If authentication is not successful, than an error message is returned to step 216. In other embodiments, the system may determine not to send an error message or may perform another act in response to a failed authentication. If authentication is successful, the process continues at step 220.

In one embodiment, the Presentation Server can respond to at least two types of requests: those that refer directly to mark-up language descriptions and those that refer to taking data from, sending data to, or managing data sources or web services. Based on whether the request is a data request or a request that refers to a mark-up language description, the method of FIG. 5 performs different sets of steps (see step 220). In one implementation, mark-up language descriptions are used to provide an application. In some embodiments, a user would initiate a request for an application and that request would be used to access a mark-up language description of the application. When that application is running on the user's machine, the application may send a request for data. In one embodiment, an application can also send a request for another application. That is, a first application running on a client machine may send a request for a mark-up language description of a second application to be compiled and sent to the client.

If the request is for mark-up language description content, then (in step 226), Compiler 170, using Object Code Generator 172, accesses the mark-up language description and compiles it. In step 228, Request Handler 164 packages the compiled code to create an HTTP response. In step 230, the HTTP response is sent to the client Presentation Renderer.

If the request was for data, then in step 234, Data Connection Manager 174 is accessed and provided with the request. In step 236, Data Connection Manager 174 connects to the appropriate external data source to have the data request performed by the external data source. The data request could include writing data to the data source, reading data from the data source, or managing the data (or data source). Step 236, therefore, can include receiving data back from the external data source. Step 236 can also include receiving a response to a data source operation. The data/information from the response is compiled into executable code in step 238, and the method continues as step 228. Note that the data can include media and step 238 could include accessing Media Transcoder 176 to transform the media to an acceptable format prior to insertion into executable code.

Figure 6:
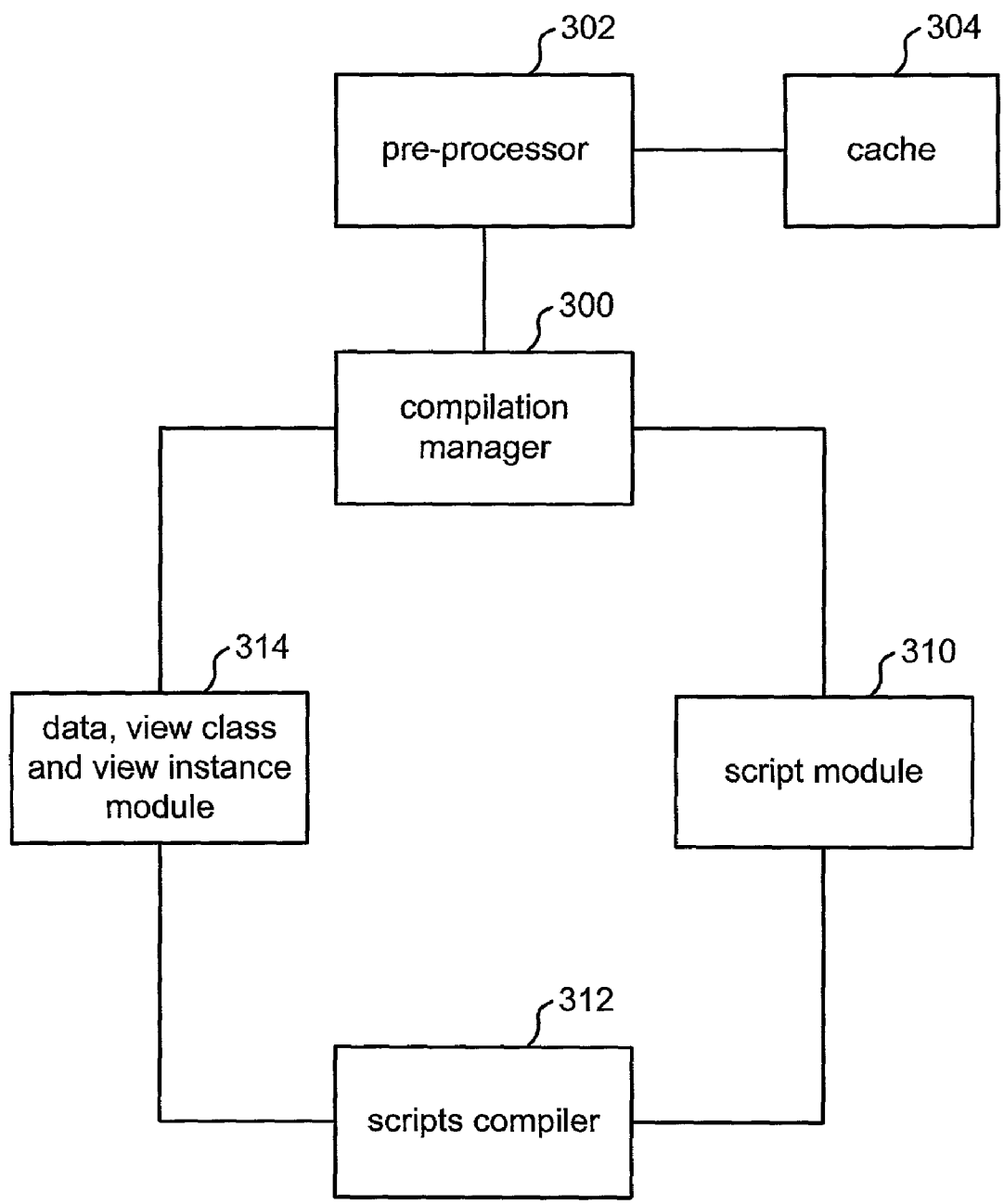
FIG. 6 is a block diagram of one embodiment of a compiler.

FIG. 6 is a block diagram, which illustrates one exemplar architecture for implementing Compiler 170. FIG. 6 show Compilation Manager 300 in communication with Pre-processor 302, Script Module 310, and data/view class/view instance Module 314. Modules 310 and 314 are communication with Scripts Compiler 312. Pre-processor 302 is also in communication with Cache 304. Compilation Manager 300 manages the compilation process. Pre-processor 302 is used to pre-process the mark-up language descriptions. Modules 310 and 314 are used with Scripts Compiler 312 to compile markup language descriptions. In one embodiment, Compilation Manager 300, Pre-processor 302, Script Module 310 and data/view class/view instance Module 314 are implemented in one object oriented class.

Figure 7:
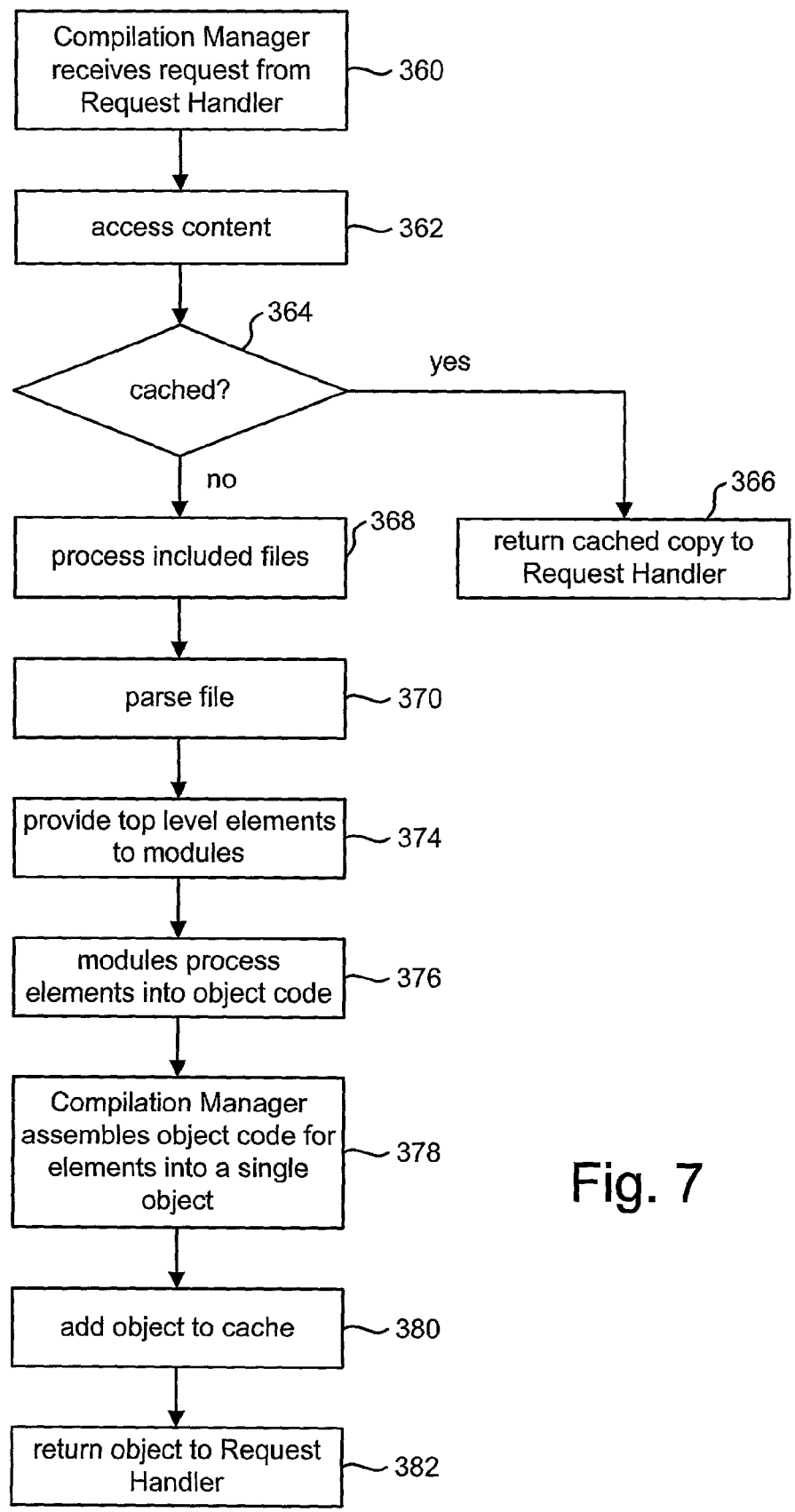
FIG. 7 is a flow chart describing one embodiment of the operation of the compiler.

FIG. 7 is a flowchart describing one embodiment of the process for compiling using the components of FIG. 6 (see step 226 of FIG. 5). In step 360, Compilation Manager 300 receives the request from the Request Handler 164. The content is accessed in step 362. That is, the compilation manager accesses the mark-up language description, which may be in a file, set of files or other type of container. In step 364, it is determined whether the mark-up language description is cached. That is, when mark-up language descriptions are compiled, the compiled versions are kept in Cache 304. Pre-processor 302 will determine whether a particular mark-up language description is found in the cache (step 364). If the mark-up language description is cached, then the cache copy is returned to Request Handler 164 in step 366. Note that a mark-up language description can include other files by reference. Thus, Pre-processor 302 only returns a cached copy if all of the included files have not been changed since the cached copy was created. If the mark-up language description has not been found in the cache, then in step 368 Pre-processor 302 processes the included files. That is, the mark-up language description may include include-style statements, such as "#include file" or href-style includes. These statements imply that the text from the included file should be "in-lined" into the description/document before compilation. Files may be recursively included. In step 370, Compilation Manager 300 parses the mark-up language description in order to identify and distribute each of the elements to the appropriate module (e.g., modules 310 or 314). The elements include view instantiations, view class definitions, data connections and scripts. Module 310 is used for scripts. Module 314 is used for view instantiations, view class definitions, and data connections. Each module knows how to turn its element into object code by making use of scripts compiler 312 and object code generator 172. In many cases, the module will first translate its elements into script as an intermediate step for producing object code. The script is then compiled into object code. In step 374, the top level elements are distributed to the appropriate module, as described above. In step 376, these modules process the elements into object code. In step 378, Compilation Manager 300 assembles object code for each of the elements into a single executable. In step 380, that executable is added to Cache 304. In step 382, that executable is returned to Request Handler 164.

Figure 8:
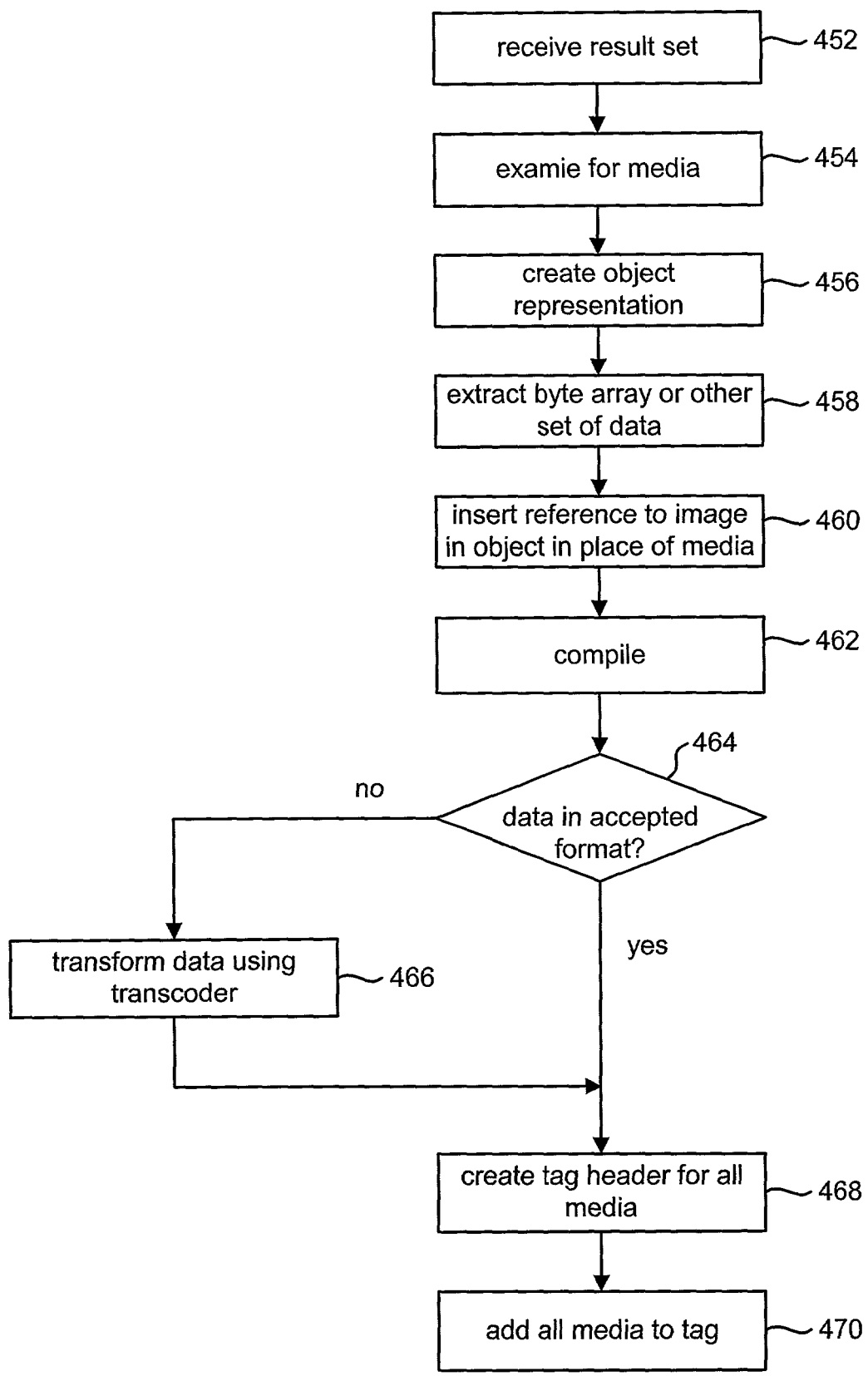
FIG. 8 is a flow chart describing one embodiment of a process for compiling media.

FIG. 8 provides a flowchart describing one embodiment for compiling media into byte code. This process can be performed as part of step 376 or step 238. In step 452 a result set is received at the data connection manager from the data source. The result set could be a file or other type of container. The result set includes the media. In step 454, the result set is examined in order to find the media. Any media found in the result set is added to a separate object for each media asset in step 456. The object would be similar to the objects described below with respect to other data. The object would include fields storing attributes such as the name of the media, the format, etc, as well as the actual media itself. In step 458, the actual media is removed from the object and replaced by a reference to the media in step 460. In step 462, the object (including the reference to the media) is compiled to SWF byte code in a similar fashion to other data described below. In step 464, it is determined whether the media data is in an acceptable format. For example, the Flash player described above accepts images in JPEG format. If the media is in a format that is not accepted by the player, then it is transformed using media transformer in step 466 to a format that is accepted by the presentation player. In step 468, the system creates a tag header for the media data. The tag header is in a format suitable for a SWF file, as described above. In step 470, the media data (not including the compiled object) are added to the tag, again in a format suitable for a SWF file. In one embodiment, it is contemplated that one tag will be used to store all of the media assets. Other embodiments use formats different than SWF and, therefore, would use formats other than SWF tags.

Figure 9:
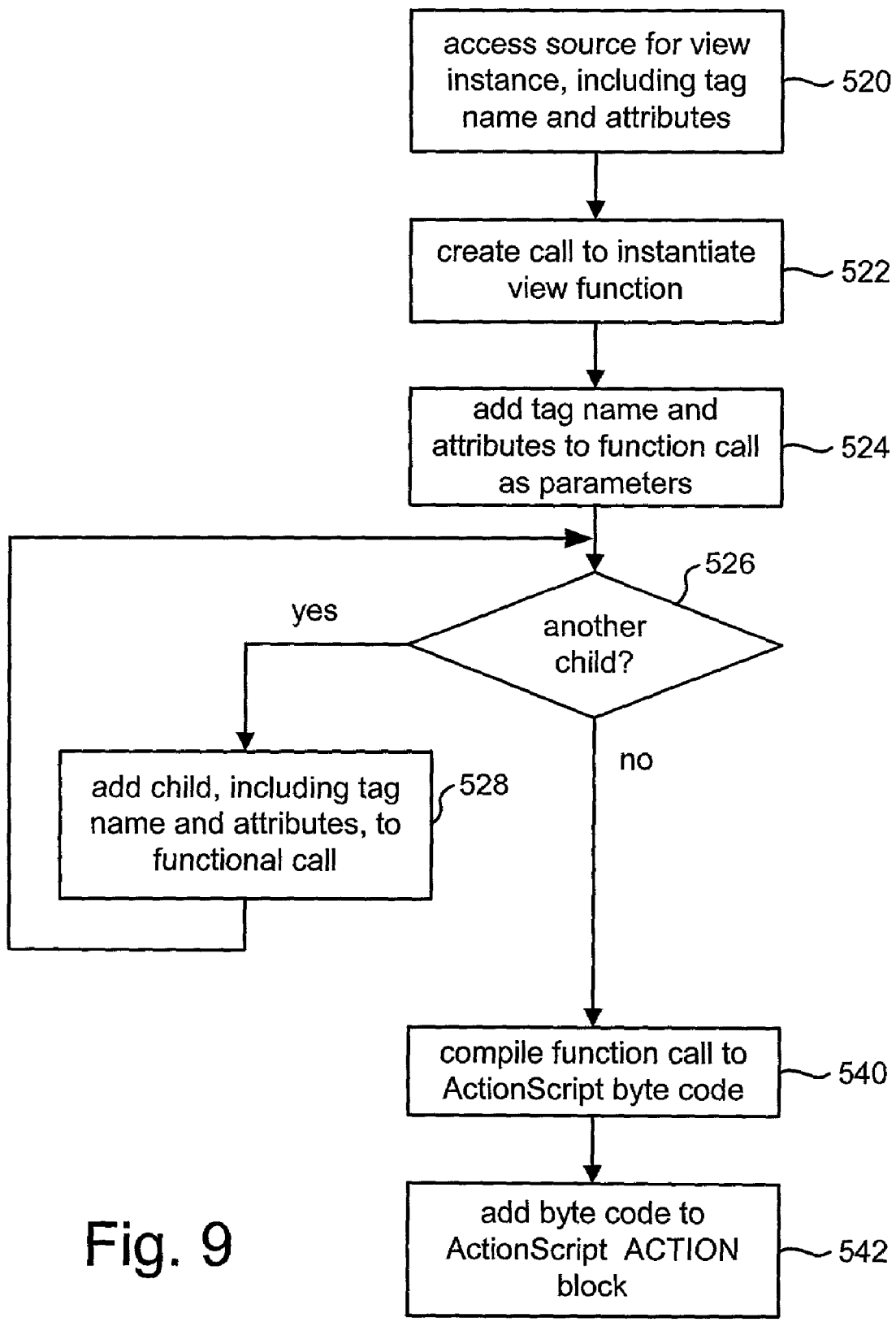
FIG. 9 is a flow chart describing one embodiment of a process for compiling view instances.

FIG. 9 is a flowchart describing a process for compiling view instances. The process of FIG. 9 will be performed during step 376. In step 520, the source code for the view instance including the tag name and attributes is accessed. In step 522, a script instruction is created that calls an instantiation view function. This instantiation view function is a function that examines the properties of its parameters and determines what kind of objects to create at run time. The instantiation view function also attaches children to the created objects. In step 524, the tag name and attributes are added to the source description of the object that is passed to the function. In step 526, it is determined whether the view instance includes any children that haven't been processed. If it does, then in step 528, a child including a tag name and attributes are added to the call to the instantiate view function. And the process continues at step 526. If there are no more children to process, then the instruction calling the instantiate view function, which is written in Action Script, is compiled to Action Script byte code in step 540. Compiling Action script to Action Script Byte code is known in the art. In step 542, the byte code is added to an ACTION block. As an example, consider the following code for a view instance:

```
<window name="Contacts">
    <view x="5" y="10"/>
</window>
```

This code should be converted to the following action script source code:

```
LzInstantiateView(
    {tagName: "window", attrs: {name: "Contacts"},
    children:
    [{tagName: "view", attrs: {x: 5, y: 10}}]}
)
```

The function LzInstantiateView is the instantiate view function that is discussed above. The view instance being transformed has one child.

Figure 10:
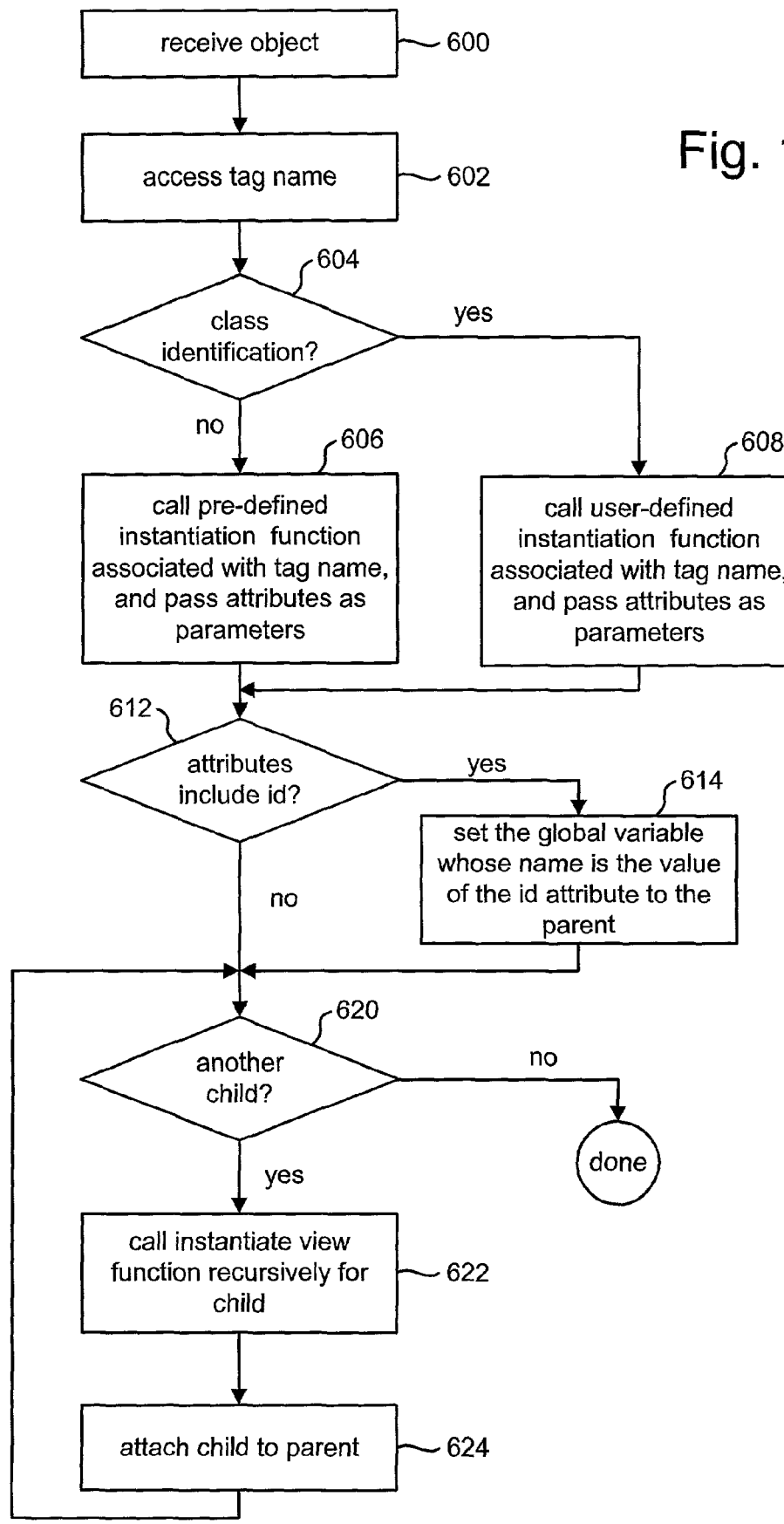
FIG. 10 is a flow chart describing one embodiment of a process for performing at least a portion of the executable code.

FIG. 10 is a flowchart describing a process performed by the instantiate view function called by the instruction created in step 522. This function is performed when the byte code is executed by the Presentation Renderer on the client. In step 600, the instantiate view function receives an object based on the parameters of the function call. The example code above would cause the following object o (this is a metalanguage variable; there may not be a run time variable bound to the instance) to be created and passed to the instantiation view function:

o.TagName="Window"
    o.attrs.name="Contacts"
    o.children[0]=o1
    o1.TagName="view"
    o1.attrs.x=5
    o1.attrs.y=10
    o1children=[ ]

In step 602, the tag name for the object is accessed (e.g., o.TagName). In step 604, it is determined that there is a class identification (e.g. o.ClassName="<user defined class name>"). If not, then a predefined instantiation function associated with the TagName is called, and that function is passed the attributes of the object in step 606. If in step 604 it is determined if there is a class identification, then it is assumed that the view is based on a user defined class and a function associated with the tag name is called, with the attributes of the object being passed as parameters in step 608. In step 612, it is determined whether the attributes of the object include the id attribute. If so, then in step 614, the global variable whose name is the value of the id attribute is set to the parent. Note that the id attribute identifies a unique name for the view instance. In step 620, it is determined whether there is another child to process. If there are no more children to process, then the method of FIG. 10 is done. If there is another child to process, then in step 622, the instantiation view function is recursively called for that child. In step 624, the result of the instantiation view function the child is attached to the parent and the method continues at step 620.

The instantiation function called in steps 606 and 608 creates objects to be displayed in the user interface. In one embodiment, there is an instantiation function for each type of object being displayed. These instantiation functions call a constructor function to create the appropriate object. For example, there will be an instantiation function for windows, an instantiation function for buttons, etc. In one embodiment, there will be a table of instantiation functions for the predefined classes. These functions are indexed by the TagName of the element. There can also be a separate table of instantiation functions for user defined classes (called in step 608) that are indexed by the name attribute. Note that the TagName for an element based on a user defined class is "instance." When a user creates a view class, this view class is compiled into a user-defined instantiation function, which creates an object at run time to be displayed in the user interface according to the user definition. This new user-defined instantiation function is added to the above described table.

Figure 11:
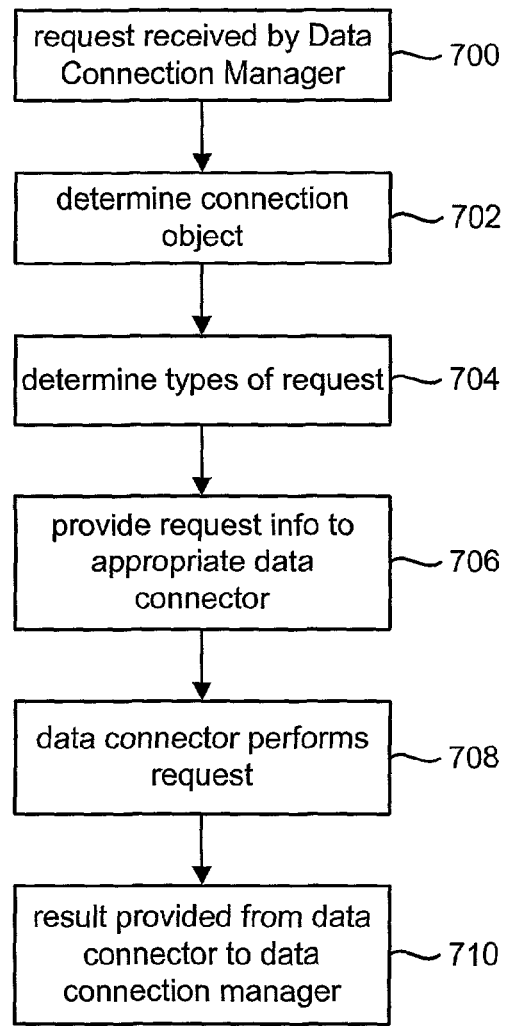
FIG. 11 is a flow chart describing one embodiment of a process for responding to a data connection request.

FIG. 11 is a flow chart that describes a process for performing data connection requests. The process of FIG. 11 is performed as part of step 236 of FIG. 5. In step 700, the data connection request is received by the Data Connection Manager. Data queries can request to read data, write data or manage a database. When the data connection manager receives a request, it first determines the data connector object associated with the request (step 702) and the type of request—read, write or manage (step 704). In one embodiment, the Presentation Server provides a plug-in interface for adding new data connector objects. Each data connector object is able to communicate with a specific data source. The data connection request contains syntax that includes the name of the data connector object, and any data connector-specific arguments that further specify the request. The request may also include unambiguous syntax that identifies the data connection and query that has been previously defined in the current session. Below is an example URL for a JDBC connection request:

http://host:port/LZ/myapp/?connector=id@source=id& . . .

In step 706, the request information is provided to the appropriate data connector. In step 708, that data connector performs the request. Step 708 includes the data connector making a connection to the external data source and requesting that the external data source perform the operation desired. In step 710, the result provided from the external data source to the data connector is forwarded to the Data Connection Manager.

Figure 12:
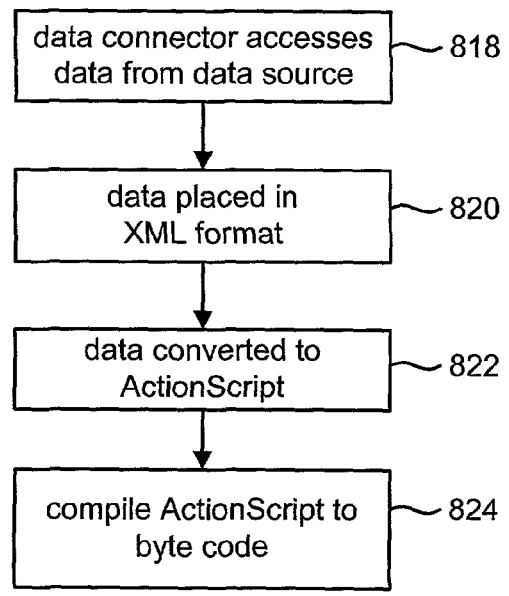
FIG. 12 is a flow chart describing one embodiment of a process for compiling data.

FIG. 12 is a flow chart describing a process for compiling data to object code. The process of FIG. 12 is performed as part of step 238 of FIG. 5. In step 818 of FIG. 12, the data connection manager accesses the data received from the data source. In step 820, the received data is placed in an XML document. For example, the following data may be received in response to a SQL SELECT statement:

| id | name | phone |
|----|------|-------|
| 1 | Joe Smith | 4155551212 |

One embodiment of step 820 converts the above data to the following:

<result id="1" name="Joe Smith" phone="4155551212">

In step 822, the XML is converted into ActionScript. For example, the above XML would be converted into the following:

resultset0=new Object( );

resultset0.name='resultset';

resultset0.attrs=new Object( );

resultset0.attrs.query='select id, name, phone from contacts where id=1';

resultset0.children=new Object( );

resultset0.children.result0=new Object( );

resultset0.children.result0.name='result';

resultset0.children.result0.attrs=new Object( );

resultset0.children.result0.attrs.id=1;

resultset0.children.result0.attrs.name='Joe Smith';

resultset0.children.result0.attrs.phone='4155551212';

In step 824 of FIG. 12, the ActionScript is compiled into ActionScript byte code. As described above, compiling action script into action script byte code is known in the art. In one embodiment, step 822 is skipped and the XML code is converted directly into byte code.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for providing content, comprising the steps of:
receiving a request from a user device for particular content, the request is received at a server;
accessing a markup language description of the particular content, the markup language description includes markup language source code which describes a behavior of the particular content on a user interface of the user device based on user interactions with the particular content via the user interface, the markup language description includes a reference to a view instance element;
at the server, converting the markup language description to a script source code by:
accessing the markup language source code to locate a tag name and associated attributes for the view instance element, the tag name is parent tag name;
accessing the markup language source code to locate an associated child tag name and associated attributes in the view instance element; and
creating script source code based on the markup language source code, the script source code includes a script instruction to call an instantiation view function in a function call, the script instruction includes the child tag name and associated attributes in the function call as parameters; and
providing executable code for the user device by compiling the script source code to byte code, the step of compiling is performed at the server in response to the request; and
transmitting the executable code from the server to the user device for execution by the user device to allow a user to access the particular content via the user interface according to the behavior and the user interactions, the instantiation view function is called at a runtime of the executable code at the user device, and creates objects which are displayed on the user interface, based on the child tag name and associated attributes.

2. A method according to claim 1, wherein:
the user device includes a rendering entity and a browser, the rendering entity is a plug-in to the browser, the plug-in is embedded in the browser before the request, and the rendering entity executes the executable code.

3. A method according to claim 2, wherein:
the server has separate object code generators and compilers for different types of rendering entities;
the request is received at the server from the user device and includes an indication that identifies a type of the rendering entity from among the different types of rendering entities; and
the executable code is created specific for the type of rendering entity using corresponding ones of the object code generators and compilers, in response to the indication.

4. A method according to claim 2, wherein:
the rendering entity is a Flash player.

5. A method according to claim 1, wherein:
the script source code comprises ActionScript and the byte code comprises corresponding ActionScript byte code.

6. A method according to claim 1, wherein:
the request for particular content is received from a browser in which a rendering entity is present as a plug-in to the browser, the browser is at the user device, and the rendering entity executes the executable code.

7. A method according to claim 1, wherein:
the particular content comprises a media file comprising video;
the markup language source code includes a source attribute which references a name of the media file, the source attribute is within a window tag in the markup language source code; and
the media file is transmitted with the executable code from the server to the user device for use by a rendering entity at the user device in allowing the user to access the video in a window on the user interface when the media file is referenced by the source attribute within the window tag when the executable code is executed.

8. A method according to claim 7, further comprising:
providing an object in the executable code which includes fields storing attributes which identify the name and a format of the media file, the name and format are provided via the user interface when the media file is rendered.

9. A method according to claim 7, wherein:
the request for particular content is received from a browser in which a plug-in to the browser is present, the browser is at the user device, and the plug-in renders the media file.

10. A method according to claim 1, further comprising the step of:
authenticating the request, the steps of compiling and transmitting are only performed if the step of authenticating is successful, and different types of authenticating are provided for different types of content, including content types of application, data and service.

11. A method according to claim 1, wherein the request from the user device for the particular content is a request for a first application, the first application runs on the user device when the executable code is executed at the user device, the method further comprising the steps of:
receiving a request at the server from the first application running on the user device for a second application;
in response to the request, accessing and compiling the second application; and
transmitting the compiled second application from the server to the user device.

12. A method according to claim 1, wherein:
the executable code comprises one or more binary files.

13. A method according to claim 1, wherein:
the executable code comprises object code.

14. A method according to claim 1, wherein:
the compiling comprises parsing the markup language description to identify first and second types of elements in the markup language description, providing the first type of element to a first compiling module which is appropriate for the first type of element to obtain first object code, providing the second type of element to a second compiling module which is appropriate for the second type of element to obtain second object code, and assembling the first and second object code into a single executable; and
the transmitting the executable code comprises transmitting the single executable to the user device.

15. A method according to claim 14, wherein:
the first type of element provides a script which defines the behavior of the particular content, and the second type of element defines a connection to an external data source.

16. A method according to claim 1, wherein:
the executable code provides a script based on the script source code which is executed when a specified event occurs when a user interacts with the particular content via the user interface, the specified event is based on at least one of user control of a pointing device and a key press.

17. A method according to claim 1, wherein:
the instantiation view function is predefined, and the executable code, when executed at the user device, calls the predefined instantiation view function associated, and passes the attributes to the predefined instantiation view function.

18. A method according to claim 1, wherein:
the instantiation view function is predefined, and the executable code, when executed at the user device, calls the user-defined instantiation view function associated, and passes the attributes to the user-defined instantiation view function.

19. A method according to claim 1, wherein the particular content includes media content, the method further comprising:
receiving the media content at the server, from an external data source;
creating an object representation of the media content, the object representation includes the media content and fields which store attributes of the media content, the attributes include a name of the media content and a format of the media content;
removing the media content from the object representation and inserting a reference to the media content into the object representation in place of the media content, then compiling the object representation to byte code;
creating a tag header;
adding the media content, but not the compiled object representation, to the tag header; and
transmitting the compiled object representation with the compiled markup language description from the server to the user device for execution by the user device to provide the particular content and the data via the user interface according to the behavior and the user interactions.

20. A method according to claim 19, further comprising:
assembling the compiled markup language description and the compiled object representation into a single executable which is transmitted as the executable code from the server to the user device.

21. A method according to claim 19, further comprising:
transcoding the media content before the adding the media content to the tag header, the transcoding is separate from the compiling of the object, the media content comprises audio which is transcoded between MP3 and WAV.

22. A method according to claim 19, further comprising:
transcoding the media content before the adding the media content to the tag header, the transcoding is separate from the compiling of the object, the media content comprises video which is transcoded between any two of the following formats: MPEG, MPEG2, SORENSON, REAL, and Animated GIF.

23. A method according to claim 19, further comprising:
transcoding the media content before the adding the media content to the tag header, the transcoding is separate from the compiling of the object, the media content comprises an image which is transcoded between any two of the following formats: JPEG, GIF, BMP, and PNG.

24. A method according to claim 19, further comprising:
transcoding the media content before the adding the media content to the tag header, the transcoding is separate from the compiling of the object, the media content comprises graphics which is transcoded between any two of the following formats: SVG, HTML, PDF and SWF.

25. A method according to claim 19, wherein:
the media content comprises audio.

26. A method according to claim 19, wherein:
the media content comprises video.

27. A method according to claim 19, wherein:
the media content comprises a movie.

28. A method according to claim 19, wherein:
the media content comprises an animation.

29. A method according to claim 19, wherein:
the media content comprises a .SWF file.

30. A method according to claim 1, wherein:
the objects which are created by the instantiation view function, and displayed on the user interface, include at least one of windows, dialogs, buttons, images, text fields, banners and animation.

31. A method according to claim 1, wherein:
the objects which are created by the instantiation view function, and displayed on the user interface, include at least one of dialogs, buttons, and text fields.

32. A method according to claim 1, wherein:
the instantiation view function, when called at the runtime of the executable code at the user device, creates a sound object on the user device, based on the tag name and associated attributes.

33. A method according to claim 1, wherein:
the instantiation view function is called recursively at the runtime of the executable code at the user device, first with the parent tag and associated attributes and then with the child tag and associated attributes, and results from calling the instantiation view function with the child tag and associated attributes are attached to results from calling the instantiation view function with the parent tag and associated attributes.

34. A method according to claim 1, wherein:
when the instantiation view function is called at the runtime, a class which is associated with the tag name is identified, and a separate table of instantiation functions for the class, indexed by tag name, is accessed, to create the objects which are displayed on the user interface.

35. A method according to claim 1, wherein:
when the instantiation view function is called at the runtime, a table of instantiation functions, indexed by tag name, is accessed, to create the objects which are displayed on the user interface.

36. A method according to claim 1, wherein:
the view instance element includes a reference to data for rendering on the user interface, and the markup language description defines a connection to an external data source for the data, the external data source is external to the server; and
the server accesses the data at the external data source based on the markup language description.

37. One or more non-transitory processor readable storage devices having processor readable code embodied on the processor readable storage devices, the processor readable code for programming one or more processors to perform the method of claim 1.

* * * * *